United States Patent [19]

Hansen

[11] 4,351,198

[45] Sep. 28, 1982

[54] HAND AND FOOT CONTROLLED THROTTLE

[75] Inventor: Kenneth N. Hansen, Waukesha, Wis.

[73] Assignee: Allis-Chalmers Corporation, Milwaukee, Wis.

[21] Appl. No.: 186,573

[22] Filed: Sep. 12, 1980

[51] Int. Cl.³ .................. G05G 11/00; G05G 5/16; F16C 11/06

[52] U.S. Cl. ............................ 74/482; 74/491; 74/501 R; 74/513; 74/531; 308/72; 403/57; 403/131

[58] Field of Search ............... 74/481, 482, 491, 501, 74/531, 512, 513; 308/72; 403/57, 69, 71, 122, 131

[56] References Cited

U.S. PATENT DOCUMENTS

| | | | |
|---|---|---|---|
| 1,553,493 | 9/1925 | Allen | 74/482 |
| 1,607,694 | 11/1926 | Schlatter et al. | 74/513 |
| 1,983,368 | 12/1934 | Hathorn | 403/122 X |
| 2,504,729 | 4/1950 | Rajan | 74/481 |
| 2,717,792 | 9/1955 | Pelley | 403/122 X |
| 2,971,397 | 2/1961 | Bunting | 74/531 X |
| 3,007,748 | 11/1961 | Firth | 308/72 |
| 4,019,401 | 4/1977 | Drone | 74/491 X |
| 4,059,025 | 11/1977 | Waack et al. | 74/482 |
| 4,162,386 | 7/1979 | Bourgeois et al. | 430/122 X |

FOREIGN PATENT DOCUMENTS

| | | | |
|---|---|---|---|
| 1003908 | 11/1951 | France | 74/491 |
| 2027115 | 2/1980 | United Kingdom | 403/131 |

Primary Examiner—Allan D. Herrmann
Attorney, Agent, or Firm—Arthur L. Nelson

[57] ABSTRACT

The hand and foot cable controlled throttle with a hand lever controlling movement of the cable and the foot pedal controlling movement of the cable sheath and cable for selectively controlling the throttle.

20 Claims, 7 Drawing Figures

HAND AND FOOT CONTROLLED THROTTLE

This invention relates to an engine throttle and more particularly to a hand and foot cable controlled throttle for selective operation of the throttle by a push rod cable, the cable sheath or the combination of both. The controls are mounted on the firewall and operate through sealed bearings to the engine side of the firewall to control the throttle.

Motor vehicles are operated through hand control throttles and foot control accelerator pedals. The automobile accelerator pedal is used conventionally to allow the person to drive with two hands on the wheel and control the acceleration and deceleration of the automobile through the foot pedal. Tractors often have another hand throttle control with a provision for setting the lever at a predetermined speed for the tractor, particularly for field work. The combination hand control throttle and the foot accelerator pedal have been used on tractors as well, since there are times it is advantageous to have a foot control with the hands free for other controls in operation of the tractor. The Hale U.S. Pat. No. 3,985,040, and the DuShane et al. U.S. Pat. No. 3,002,397, illustrate the combination of hand and foot control throttles used for tractors. These provide the option of using a hand controlled or foot controlled throttle to provide a more versatile control and adapt the controls on the tractor to the requirements of the work conducted by the tractor. This invention includes a hand throttle lever and a foot accelerator pedal operating through a sheathed cable.

It is an object of this invention to provide a handle throttle lever and a foot accelerator pedal to operate the throttle on the engine of a tractor.

It is another object of this invention to provide a hand throttle lever and a foot accelerator pedal operating through a sheathed cable to selectively operate singly or jointly through the cable from the foot and hand controls.

It is a further object of this invention to provide a hand throttle lever and a foot accelerator pedal mounted in sealed bearings on the firewall to selectively operate singly or jointly the throttle of the tractor engine.

The objects of this invention are accomplished through a hand throttle lever pivotally mounted on the firewall of a tractor cab to operate the cable of a sheathed cable to control the engine throttle. Friction washers are provided on the hand throttle lever to infinitely position the throttle lever on an arcuate guide to control the speed of the engine. The foot accelerator pedal is also pivotally mounted in the firewall and is pivotally supported on a sealed bearing to operate a cable anchor arm carrying the cable sheath. Movement of the cable sheath also moves the cable to operate the engine throttle by the foot accelerator pedal. The throttle can be operated singly through the hand throttle lever or the foot accelerator pedal or can be operated by both of these control means. The firewall pivotally supports the hand throttle lever and the foot accelerator pedal and each of the bearings is a sealed bearing assembly to prevent any sound transmission through the firewall.

Referring to the drawings, the preferred embodiment of this invention is illustrated.

Figures 1A, 6:
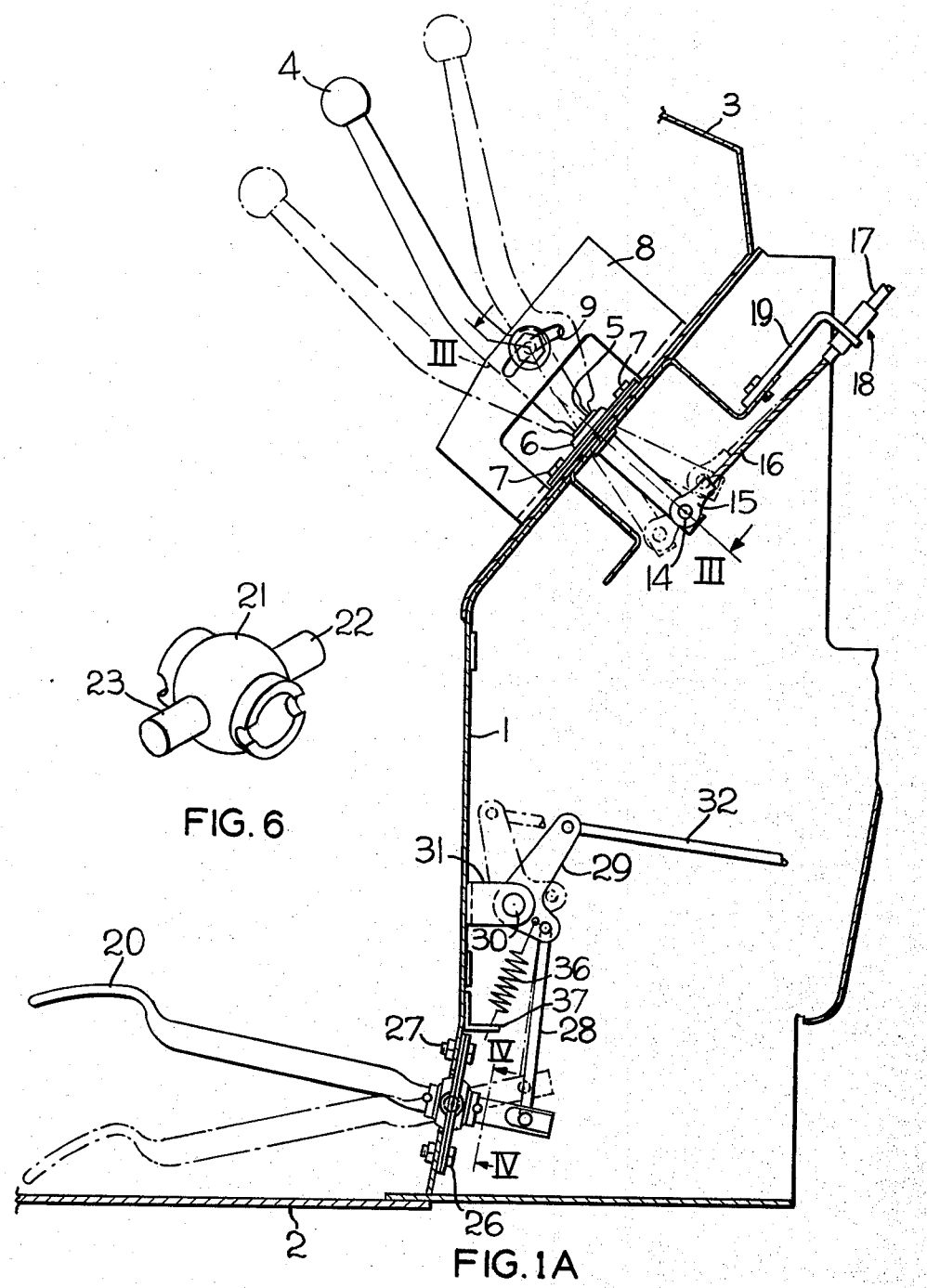
FIG. 1A illustrates the hand throttle lever and the foot accelerator pedal mounted in the firewall.
FIG. 6 is a three dimentional view of the journaled portion of the foot pedal bearing.
Figure 1B:
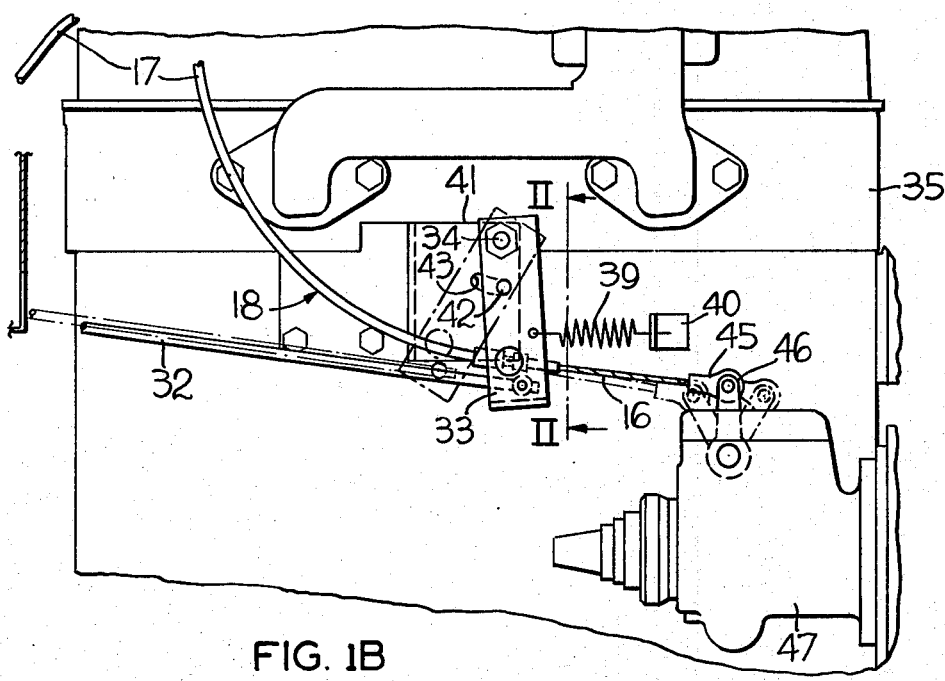
FIG. 1B illustrates the cable and push rod connections to the cable anchor arm of the throttle on the engine.
Figure 2:
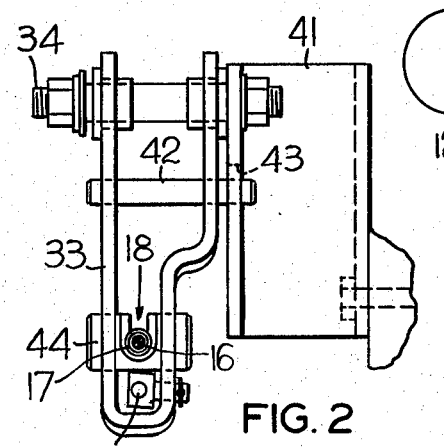
FIG. 2 illustrates a cable anchor arm and a cable connection.
Figure 3:
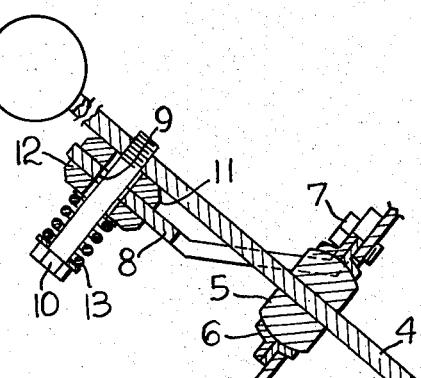
FIG. 3 is a cross section view taken on line III—III of FIG. 1A.
Figure 5:
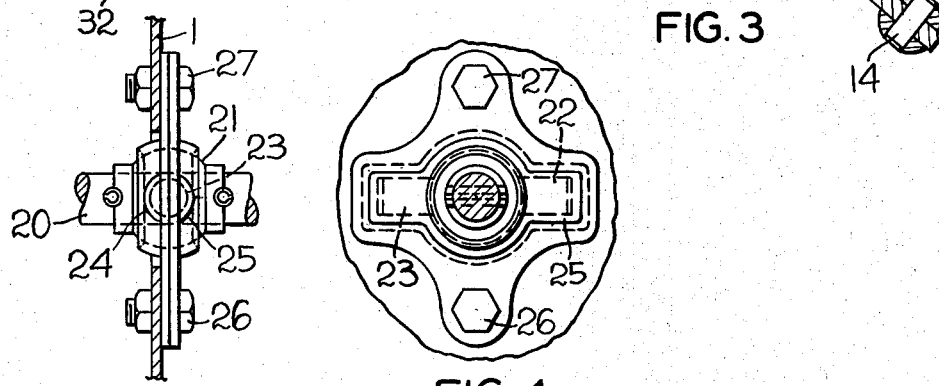
FIG. 5 is a partial section and side view of the foot pedal bearing.
Figure 4:
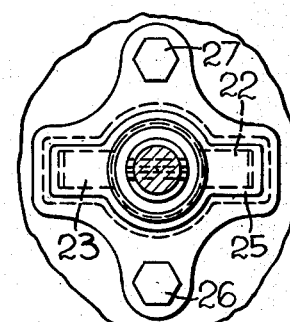
FIG. 4 is a cross section view taken on line IV—IV of FIG. 1A.

Referring to the drawings, FIG. 1A shows the cab firewall 1 mounted on the vehicle platform 2. The firewall 1 extends upwardly to the instrument panel 3. The hand throttle lever 4 is shown selectively in three positions and extending through a spherical element 5 in the firewall 1. The element 5 is mounted in the bushing 6 which is fastened through a plurality of bolts 7. The hand throttle lever 4 is pivotally supported in the spherical element 5 and its movement is controlled by the lever guide plate 8 which is mounted on the firewall and is formed with an arcuate slot 9. The bolt 10 is fastened to the throttle lever 4 and extends through the slot 9. Friction washers 11 and 12 are pressed against the lever 4 and the guide plate 8 by the spring 13 on the bolt 10. Friction washers 11 and 12 selectively maintain any one of an infinite number of positions for the lever as the bolt 10 moves in the slot 9.

The lower end of the lever 4 is connected by a pin 14 to the clevis 15 of cable 16. The cable 16 runs within the sheath 17 of the sheathed cable 18. The sheath 17 of the sheathed cable 18 is anchored by the bracket 19 which is carried on the firewall 1. The cable 16 is free to reciprocate with in the sheath 17 as the lever 4 is pivoted up and down between the position shown in FIG. 1A.

The foot accelerator pedal 20 is mounted in a spherical bearing 21 having coaxial aligned cylindrical ends 22 and 23. The cylindrical aligned ends fit into mating bushing shells 24 and 25 to form trunnion portions and provide a pivotal movement of the foot accelerator pedal 20 as it extends through the firewall 1. The mating bushing shells 24 and 25 are bolted to the firewall by means of the bolts 26 and 27. The foot accelerator pedal 20 is pivotally connected to the link 28 which in turn is pivotally connected to the bell crank 29. The bell crank 29 is pivotally supported on the pin 30 carried in the bracket 31 mounted on the firewall 1. Bell crank 29 has an arm pivotally connected to the push rod 32 which extends to pivotally connecting the cable anchor arm 33 which is pivotally supported on the bolt 34 on the engine 35. A return spring 36 connected to the bell crank 29 and to the bracket 37 returns the bell crank to its return position and the lever 20 to its retracted position.

The cable anchor arm is returned to its return position by the return spring 39 connected between the cable anchor arm 33 and the bracket 40.

Cable anchor arm 33 is shown mounted by bolt 34 on the bracket 41. The pin 42 carried on the cable anchor arm 33 extends through the slot 43 which limits the pivotal movement of the cable anchor arm 33. The sheathed cable 18 is mounted in a trunnion 44 in the lower end of the cable anchor arm 33. Sheath 17 is mounted in the trunnion 44 while the cable 16 extends through the sheath to the clevis 45 which in turn is connected to the throttle arm 46 of the fuel pump 47. Cable 16 is operated directly from the hand throttle lever 4 when the lever is pivoted. Sheath 17 carries the cable 16 and when the push rod 32 pivots the lever. The sheath and cable anchor operate the throttle control arm 46.

The operation of the device will be described in the following paragraphs.

The hand throttle lever 4 is pivotally mounted in spherical element 5 of the firewall 1. The spherical elements 5 and 6 form a sealed bearing assembly in the firewall so that no sound nor air moves through the bearing assembly of the lever 4. The lever 4 although mounted in the spherical element 5 is guided in its movement by the guide plate 8 mounted on the firewall 1. The limits of pivotal travel of the hand throttle lever 4 is determined by the arcuate opening 9 in the lever guide plate 8. As the lever 4 pivots up and down, the cable 16 reciprocates within the sheath 17 of the sheathed cable 18.

The foot accelerator pedal 20 is mounted in a spherical element 21 in the firewall in a sealed bearing. The movement of the pedal 20 is a pivotal movement due to the aligned cylindrical ends 22 and 23 of the spherical element 21 which carries the accelerator foot pedal 20. The accelerator foot pedal 20 pivots in the sealed bearing assembly and reciprocates the link 28 to pivot the bell crank 29 and operate the push rod 32. The push rod 32 pivots the cable anchor arm 33. Pivotal movement of the cable anchor arm moves the end of the cable carrying the sheath 17 and the cable 16 which in turn operate the throttle arm 46. The throttle arm 46 can be individually operated by either the hand throttle lever 4 through the cable 16 or the foot accelerator pedal 20 through the linkage operating the cable anchor arm 33. Pivotal movement of the cable anchor 33 moves the sheath 17 and cable 16 to operate the throttle arm 46. The lever and pedal can be operated singly or can be operated in combination to control the throttle arm 46. The hand throttle lever can be positioned in any of an infinite number of positions as it is pivoted due to the friction washers 11 and 12 which engage the sides of the guide plate 8 as the lever is pivoted and the bolt 10 moves through the arcuate opening 9. The throttle can be pre-set to any speed by the hand throttle lever 4 or can be controlled by the accelerator pedal 20 to vary the speed responsive to the operator's control.

The embodiments of the invention in which an exclusive property or privilege is claimed are defined as follows:

1. A motion transmitting mechanism comprising, a wall, a throttle lever including a manually controlled arm, an actuator arm, a journaled portion intermediate said arms extending through said wall, a bearing mounted on said wall supporting said journaled portion of said lever providing a sealed bearing assembly, a pedal having a journaled portion mounted for extending through said wall, a link means connected to said lever for operating a throttle, a linkage in conjunction with said link means and connected to said pedal for operating said throttle.

2. A motion transmitting mechanism as set forth in claim 1 including, a bracket mounted on said wall, means on said bracket slidably connected with said lever confining the pivotal movement of said lever to lie in a common plane.

3. A motion transmitting mechanism as set forth in claim 2, wherein said bracket defines an arcuate slot for receiving a portion of said lever confining the movement of said lever to an arcuate movement and limiting the movement by the length of said slot.

4. A motion transmitting mechanism as set forth in claim 3 including a bolt carrying friction washers extending through said arcuate slot, means biasing said washers for engaging said lever for defining infinite positions of said lever in its pivotal movement.

5. A motion transmitting mechanism as set forth in claim 4 wherein said lever defines a hand throttle lever.

6. A motion transmitting mechanism as set forth in claim 1 including, axially aligned cylindrical bearing elements integral with a spherical portion defining a pivotal axis of said pedal, said spherical portion defining a central opening defining an axis normal to the pivotal axis of said pedal for receiving said pedal, means fastening said pedal to said spherical portion.

7. A motion transmitting mechanism as set forth in claim 1 wherein said journaled portion of said pedal includes, trunnion portions connected to a spherical journaled portion to limit the movement of said pedal to a pivotal movement with the trunnion portions defining the pivotal axis of said pedal.

8. A motion transmitting mechanism as set forth in claim 7 wherein said pedal defines a foot accelerator pedal for a vehicle.

9. A motion transmitting mechanism as set forth in claim 7 wherein said wall defines a firewall.

10. A motion transmitting mechanism as set forth in claim 7 including a spherical journaled portion and a trunnion shaft defining an integral structure.

11. A throttle control mechanism comprising, a pivotally supported hand throttle lever, a pivotally supported foot accelerator pedal, a movably supported cable anchor arm, a throttle control member, a sheathed cable including a cable and a sheath, means connecting said cable to said hand throttle lever and said throttle control member for operating said throttle control member, a retainer anchoring one end of said cable sheath in a stationary position, means fastening the other end of said sheath to said cable anchor arm, a linkage connecting said foot accelerator pedal to said cable anchor arm, said hand throttle lever thereby operating said throttle control member through said cable and said foot accelerator pedal operating said throttle control member through said linkage and said cable sheath and cable.

12. A throttle control mechanism as set forth in claim 11 including, a firewall supporting said hand throttle lever and said foot accelerator pedal.

13. A throttle control mechanism as set forth in claim 11 including, a spherical sealed bearing pivotally supporting said hand throttle lever.

14. A throttle control mechanism as set forth in claim 11 including, a sealed bearing pivotally supporting said foot accelerator pedal.

15. A throttle control mechanism as set forth in claim 11 including, a lever guide plate defining stops for limiting the pivotal movement of said hand throttle lever, and friction means selectively positioning said lever in one of the plurality of selected positions.

16. A throttle control mechanism as set forth in claim 11 including, a return spring connected to said foot accelerator pedal and linkage to return said pedal to a retracted position.

17. A throttle control mechanism as set forth in claim 11 wherein said linkage includes a pivotally mounted bell crank, a link connected between said foot accelerator pedal in said bell crank, a push rod connected between said bell crank and said cable anchor arm.

18. A throttle control mechanism as set forth in claim 11 including, an engine pivotally supporting said cable anchor lever, a fuel feeding mechanism pivotally supporting said throttle arm.

19. A throttle control mechanism as set forth in claim 11 including, sealed bearings pivotally supporting said hand throttle lever and said foot accelerator pedal to provide a sealed assembly, a firewall pivotally supporting said sealed bearings and providing a sealed wall with the lever and pedal extending through said wall to operate said throttle control member.

20. A throttle control mechanism as set forth in claim 11 including, a firewall, bushings pivotally supporting said hand control lever and said foot accelerator pedal, sealing means sealing said lever and pedal extending through said firewall, means pivotally supporting said cable anchor arm.

* * * * *